United States Patent
Bhagwat et al.

(10) Patent No.: US 9,295,183 B2
(45) Date of Patent: Mar. 22, 2016

(54) METHOD AND SYSTEM FOR REAL TIME MONITORING, PREDICTION, ANALYSIS AND DISPLAY OF TEMPERATURES FOR EFFECTIVE THERMAL MANAGEMENT IN A DATA CENTER

(75) Inventors: Harshad Bhagwat, Maharashtra (IN); Amarendra K. Singh, Maharashtra (IN); Sankara Narayanan D., Tamil Nadu (IN); Rajesh Jayaprakash, Tamil Nadu (IN); Anand Sivasubramaniam, Tamil Nadu (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 300 days.

(21) Appl. No.: 13/602,825

(22) Filed: Sep. 4, 2012

(65) Prior Publication Data
US 2013/0073245 A1 Mar. 21, 2013

Related U.S. Application Data
(63) Continuation-in-part of application No. 13/234,763, filed on Sep. 16, 2011.

(30) Foreign Application Priority Data
Dec. 14, 2011 (IN) .......................... 3524/MUM/2011

(51) Int. Cl.
*G06G 7/56* (2006.01)
*H05K 7/20* (2006.01)
*G06F 17/50* (2006.01)

(52) U.S. Cl.
CPC ........ *H05K 7/20836* (2013.01); *G06F 17/5009* (2013.01); *G06F 2217/16* (2013.01); *G06F 2217/80* (2013.01)

(58) Field of Classification Search
CPC ............. H05K 7/20836; G06F 2217/80; G06F 2217/16; G06F 17/5009
USPC .............................................................. 703/5
See application file for complete search history.

(56) References Cited

U.S. PATENT DOCUMENTS

| | | | |
|---|---|---|---|
| 7,031,870 B2 | 4/2006 | Sharma et al. | |
| 2007/0078635 A1* | 4/2007 | Rasmussen et al. | 703/1 |
| 2009/0150133 A1* | 6/2009 | Archibald et al. | 703/9 |
| 2009/0326879 A1* | 12/2009 | Hamann et al. | 703/2 |
| 2009/0326884 A1* | 12/2009 | Amemiya et al. | 703/6 |
| 2010/0049494 A1* | 2/2010 | Radibratovic et al. | 703/13 |
| 2010/0076607 A1* | 3/2010 | Ahmed et al. | 700/276 |
| 2010/0085196 A1* | 4/2010 | Stiver et al. | 340/584 |
| 2010/0110076 A1 | 5/2010 | Hao et al. | |

(Continued)

OTHER PUBLICATIONS

R.K. Sharma, et al., "Balance of Power: Dynamic Thermal Management for Internet Data Centers," Internet Systems and Storage Laboratory, HP Laboratories Palo Alto, HPL-2003-5, Feb. 18, 2003.*

(Continued)

*Primary Examiner* — Saif Alhija
(74) *Attorney, Agent, or Firm* — Hayes Soloway, P.C.

(57) ABSTRACT

The application provides a method and system for real time monitoring and prediction of temperatures in a data center for effective thermal management. Further, the invention provides a method and system for analyzing and display of monitored and predicted temperatures for obtaining complete temperature profile of the data center.

22 Claims, 2 Drawing Sheets

(56) References Cited

U.S. PATENT DOCUMENTS

2010/0292976 A1* 11/2010 Newcombe et al. ............ 703/13
2011/0301911 A1* 12/2011 Vangilder et al. ............. 702/136
2012/0041569 A1* 2/2012 Zhang et al. .................... 700/17

OTHER PUBLICATIONS

Chase, Jeffrey S., et al. "Managing energy and server resources in hosting centers." ACM SIGOPS Operating Systems Review. vol. 35. No. 5. ACM, 2001.*

J.S. Chase, et al., "Weatherman: Automated, Online and Predictive Thermal Mapping and Management for Data Centers," IEEE International Conference on Autonomic Computing, Jun. 13-16, 2006, pp. 155-164.*

Tang, Qinghui, et al. "Sensor-based fast thermal evaluation model for energy efficient high-performance datacenters." Intelligent Sensing and Information Processing, 2006. ICISIP 2006. Fourth International Conference on. IEEE, 2006.*

Pacific Gas and Electric Company, "High Performance Data Centers, A Design Guidelines Sourcebook," Jan. 2006.*

Ratnesh K. Sharma, Cullen E. Bash, Chandrakant D. Patel "Dimensionless Parameters for Evaluation of Thermal Design and Performance of Large-Scale Data Centers".

Tim Taylorand Hormoz Kazemzadeh "Integrated SCADA/DMS/OMS: Increasing Distribution Operations Efficiency".

* cited by examiner

METHOD AND SYSTEM FOR REAL TIME MONITORING, PREDICTION, ANALYSIS AND DISPLAY OF TEMPERATURES FOR EFFECTIVE THERMAL MANAGEMENT IN A DATA CENTER

CROSS REFERENCE TO RELATED APPLICATION

This application claims benefit of Indian Patent Application having Serial No. 3524/MUM/2011 filed on Dec. 14, 2011, and this application is a continuation-in-part of U.S. application having Ser. No. 13/234,763 filed Sep. 16, 2011 which claims priority to Indian Patent Application having Serial No. 652/MUM/2011 filed Mar. 9, 2011, the entire disclosures of which are incorporated herein by reference.

FIELD OF THE APPLICATION

The present application relates to thermal management of data centers. Particularly the application relates to real time monitoring, prediction and analysis of temperatures in a data center, and displaying the same for effective thermal management.

BACKGROUND OF THE APPLICATION

A computer data center may typically contain plurality of servers, various equipments such as telecommunication, networking, switch and other electronic equipment arranged in racks or frames. The heat is generated by such electronic equipment and the data center is cooled with the help of cooling units, such as computer room air conditioners (CRAC) or computer room air handlers (CRAH) for effective thermal management.

The major challenge for the data center managers is to ensure safety and reliability of electronic equipment by ensuring appropriate operating temperatures in the data center. Manufacturers of any computing equipment specify the recommended range and allowable range of temperature that need to be maintained around the equipment. Prolonged exposure of equipment to conditions beyond recommended range may result in decreased equipment reliability and longevity; it could even result in higher temperature at some spots in the data center i.e. hot spots, leading to the failure of equipment.

In the current scenario, due to lack of distributed sensing and continuous monitoring of temperatures in the data center; thermal problems go unobserved and further leading to thermal failures. Typically, data centers are not equipped with large number of temperature sensors, thus a reasonable understanding of thermal management in the data center becomes difficult to develop. Temperature sensors may not be placed at important locations, for example, at inlets of racks. Data center manager may not be aware of critical locations to place temperature sensors. In addition, it is also difficult and expensive to place sensors in legacy data centers. Hence there is a definite need for a method and system capable of continuously monitoring and prediction of temperatures and analyzing the complete temperature profile in the data center even when the data center has fewer sensors, and further display them for effective thermal management.

With the objective of overcoming the problems associated with distributed sensing and continuous monitoring of temperatures for achieving effective thermal management of a data center, it is evident that there is a need to have a method and system for providing real time monitoring of temperatures at various locations in the data center where sensors are placed, prediction of temperatures at other critical locations in the data center where sensors are not present. There is also a need to have a method and system that can analyze the complete temperature profile in the data center, generate alarms and notifications and further display of various monitored and predicted temperatures, alarms, notifications on a user interface (UI).

OBJECTIVES OF THE APPLICATION

In accordance with the present application, the primary objective is to provide real time monitoring of temperatures in a data center for effective thermal management.

Another objective of the present application is to enable a method and system for predicting temperatures at various locations in the data center where sensors are not present.

Another objective of the present application is to enable a method and system for analysis of the complete temperature profile in the data center, utilizing monitored and predicted temperatures.

Another objective of the present application is to enable a method and system for displaying real time monitored and predicted temperatures in a data center on a user interface.

Another objective of the present application is to enable a method and system for generating alarms and notification after analyzing respective monitored and predicted temperatures in a data center on a user interface.

SUMMARY OF THE APPLICATION

Before the present methods, systems, and hardware enablement are described, it is to be understood that this application in not limited to the particular systems, and methodologies described, as there can be multiple possible embodiments of the present application which are not expressly illustrated in the present disclosure. It is also to be understood that the terminology used in the description is for the purpose of describing the particular versions or embodiments only, and is not intended to limit the scope of the present application which will be limited only by the appended claims.

The present application provides real time monitoring of temperatures in a data center for effective thermal management.

In one aspect of the application, a method and system is provided for predicting temperatures at various locations in the data center where sensors are not present.

Further, the monitored and predicted temperatures are analyzed for obtaining complete temperature profile of the data center.

In an aspect of the application, a method and system is provided for displaying real time monitored and predicted temperatures in a data center on a user interface. In addition, alarms and notification are generated after analyzing respective monitored and predicted temperatures in a data center.

BRIEF DESCRIPTION OF THE DRAWINGS

The foregoing summary, as well as the following detailed description of preferred embodiments, are better understood when read in conjunction with the appended drawings. For the purpose of illustrating the application, there is shown in the drawings exemplary constructions of the application; however, the application is not limited to the specific methods and system disclosed. In the drawings.

DETAILED DESCRIPTION OF THE APPLICATION

Figure 1:
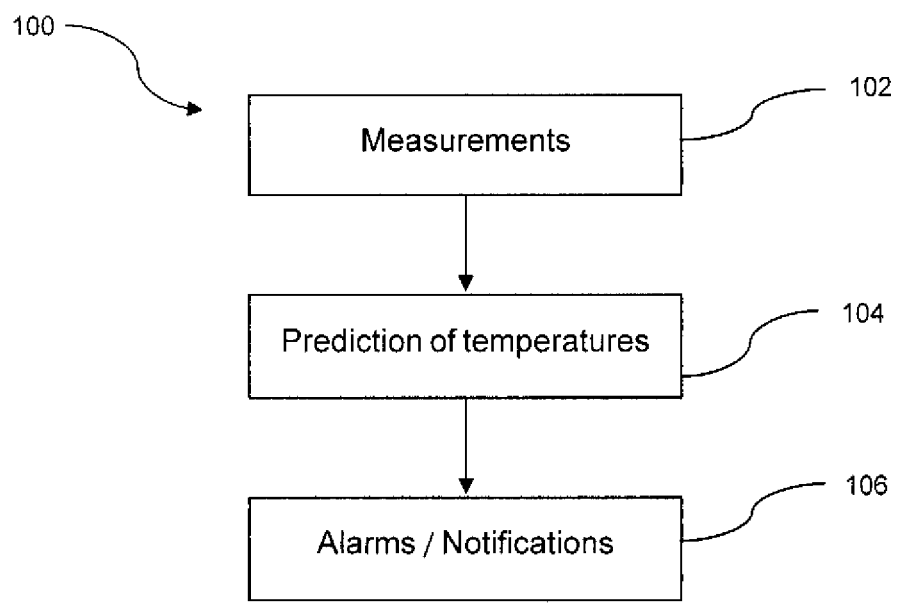
FIG. 1 a block diagram showing the operational mode of online monitoring of thermal management in data center.

Some embodiments of this application, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present application, the preferred, systems and methods are now described.

The disclosed embodiments are merely exemplary of the application, which may be embodied in various forms.

The present application provides a method for determining cooling characteristics of a data center for providing effective thermal management. In this regard, one embodiment of such a method, among others, can be broadly summarized by the following processor implemented steps: selecting the configuration of the data center comprising of design and operational parameters; selecting at least one pair of components in the data center and further selecting at least one definition of influence indices for the said pair of components; calculating the defined influence indices for the said pair of components; normalizing calculated influence indices using normalization methods; analyzing normalized influence indices by comparing normalized influence indices with other similar influence indices or by comparing with thresholds; determining cooling characteristics of the data center and identifying the thermal inefficiencies in the data center using analyzed influence indices; optimizing configuration of the data center comprising of design and operational parameters of the data center for providing effective thermal management; real time monitoring temperatures in a data center using plurality of temperature sensors for effective thermal management; predicting said temperatures at various locations in the data center where temperature sensors are not present; and displaying real time monitored, predicted temperatures in the data center on a user interface and generate alarms and notification after analyzing respective monitored and predicted temperatures in a data center.

Particularly, the present application makes use of thermal model which utilizes the method disclosed in Indian patent application 652/MUM/2011 and U.S. application Ser. No. 13/234,763 for prediction of temperatures.

The present application provides a system for determining cooling characteristics of a data center for providing effective thermal management. Briefly described, in architecture, one embodiment of the system, among others, includes the following: means for selecting the configuration of the data center comprising of design and operational parameters; means for selecting at least one pair of components in the data center and further selecting at least one definition of the influence indices for the said pair of components; means for calculating the defined influence indices for the said pair of components; means for normalizing calculated influence indices using normalization methods; means for analyzing normalized influence indices by comparing normalized influence indices with other similar influence indices and comparing with thresholds; means for determining cooling characteristics of the data center and identifying the thermal inefficiencies in the data center using analyzed influence indices; means for optimizing configuration comprising of design and operational parameters of the data center for providing effective thermal management; and means to monitor, predict, analyze and display temperatures in the data center in real time for effective thermal management, wherein the data center has a plurality of computing devices, a plurality of temperature sensors and at least one display device, displaying monitored and predicated temperatures along with alarms and notifications on a user interface, electronically and commutatively coupled with each other.

The present application uses specific terminologies such as CRAC, rack, etc. only for simplicity. The subject matter of the present application is applicable to any type of electronic equipment like servers, networking equipment, telecommunications equipment etc arranged in any fashion, any type of air delivery mechanism such as raised floor, overhead ducts etc, any type of air cooling infrastructure and any type of cooling units.

The data center contains racks, housing various electronic and electric equipment and the racks are arranged in rows. Heat generated by the electronic and electric equipment is cooled by CRACs which are situated near periphery of the data center. These CRACs enable cold air to flow into the under-floor plenum. This cold air is delivered to intended places (e.g. fronts of racks) through tiles or vents. The equipment typically has fans for taking in cold air. This air picks up the heat generated and the hot air is exhausted. Some of this hot air is returned back to CRAC and some of this hot air may mix with cold air from tiles and recirculated into inlets of equipment. This recirculation of hot air may cause rising of temperature at inlets of racks above recommended temperature suggested by manufacturer of equipment. These locations of high temperatures are called hot spots. The heat generation inside racks change with time depending upon amount of workload put onto the equipment inside the racks. The CRAC have mechanism to change amount of cooling dynamically according to changing the heat load conditions in the data center. There may be emergency cases of CRAC failure causing the temperatures at some regions in the data center to overshoot. In this way, various parameters in the data center such as temperatures at inlets of racks, heat generation by equipment inside racks and amount of cooling provided by CRAC are very dynamic. Given these dynamic conditions in the data center, continuous monitoring with alarms and notifications enables data center managers to supervise the data center effectively and reliably.

Continuous monitoring of dynamic environment in data center requires continuous sensing of temperature at various locations such as the inlets and outlets of racks, and also sensing of temperature at the supply and returns of CRAC etc. But in reality, data centers are not generally equipped with enough number of sensors to completely characterize the temperature profile in the data center. Moreover, the sensors placed are not at important locations like probable hot spot locations. Data managers are even unaware of important locations. It is difficult and expensive to put enough number of sensors in legacy data centers. To solve all the above issues, present invention makes use of a thermal model to predict the temperatures at various locations in the data center using measured temperatures at few locations in the data center and measured or predicted power consumption of racks.

Referring to FIG. 1 is a block diagram showing the operational mode of online monitoring of thermal management in data center.

Note that following discussion only illustrates one of the procedures to be used. These procedure may need some modification, some parts may be added, removed or the process may be used iteratively while actual use. Some of the steps may involve offline work to be carried out. For example, development of thermal model makes use of Computational Fluid Dynamics (CFD) model of the data center which may take longer time to be used for operational mode of the method; hence this calculation can be done offline.

The procedure starts with step 102 in which measurement or prediction of power consumption of racks and measurement of temperatures at various locations is carried out. Temperatures are measured using sensors which are typically thermocouples. These sensors may be placed at locations like at inlets and outlets of racks, return and supply of CRAC. Typically, data center are equipped with only few number of sensors. As will be explained in later sections, prediction of temperatures using thermal model requires temperatures measured at few locations. Accordingly only few sensors are required to be placed in data center.

The power consumption of racks can be measured using iPDUs which measure the power consumption of devices connected to their outlets and can be polled over the network. Power consumption can also be measured by leveraging Lights On Management (LOM), which is a technology built into the servers that includes remote management of servers including switching them off or on. A typical LOM architecture has separate management processer with its own system software and network interface. Current LOM installations measure the power consumption of the servers they control. This in turn can be polled through the LOM's network interface. Power consumption of servers inside racks can be predicted by using an estimation model too, where an empirical estimation is done by using CPU utilization which can be measured using software. These measured or predicted power consumption of racks and measurement of temperatures is then displayed to the data center manager via the user interface as explained in FIG. 2 in the later sections.

During the step 104, temperatures at various locations are predicted using a thermal model and measurements of temperatures carried out at few locations. This thermal model makes use of method of prediction of temperatures as disclosed in our patent application 652/MUM/2011. In one embodiment of the invention, temperatures at supply of CRAC and outlet of racks are measured and temperatures at other locations like inlets of racks, returns of CRAC are predicted using the thermal model. In an alternate embodiment of the invention, temperatures at supply of CRAC are measured and the temperatures at outlets of the racks along with temperatures at inlets of racks and returns of CRAC are predicted using the thermal model. The temperatures at outlets of the racks are predicted from temperatures at inlets of racks using equation (1) stated below:

$$T^{out}(R_j) = T^{in}(R_j) + \frac{P(R_j)}{\dot{m}^{in}(R_j) * C_p} \quad \text{Equation (1)}$$

Where $T^{and}(R_j)$ denotes temperature of air at outlet of a rack.
$T^{in}(R_1)$ denotes temperature of air at inlet of a rack
$P(R_j)$ denotes the power consumption of rack $R_j$.
$\dot{m}^{in}(R_j)$ denotes mass flow at the inlet of a rack $C_p$, denotes specific heat of air at constant pressure and room temperature In an alternate embodiment of the invention, temperatures at various locations in the data center are predicted using the thermal model and a temperature map is prepared. These predicted temperatures and temperature map are then displayed to the data center manager via the user interface as shown in FIG. 2.

At the step 106, the monitored and predicted temperatures at various locations are analyzed and alarms and notifications are generated. The monitored and predicted temperatures at various locations are analyzed by comparing with pre-defined threshold. If temperatures at some locations are exceeding their pre-defined threshold then an alarms and notifications are generated. Alarms such as electronic buzzers, visual clues in the user interface screen, SMSes/E-mails to the concerned people enable the data center managers to act immediately upon an emergency (in case of a hot spot, in case of equipment failure etc.). These alarms are also displayed to the data center manager via the user interface shown as shown in FIG. 2.

Figure 2:
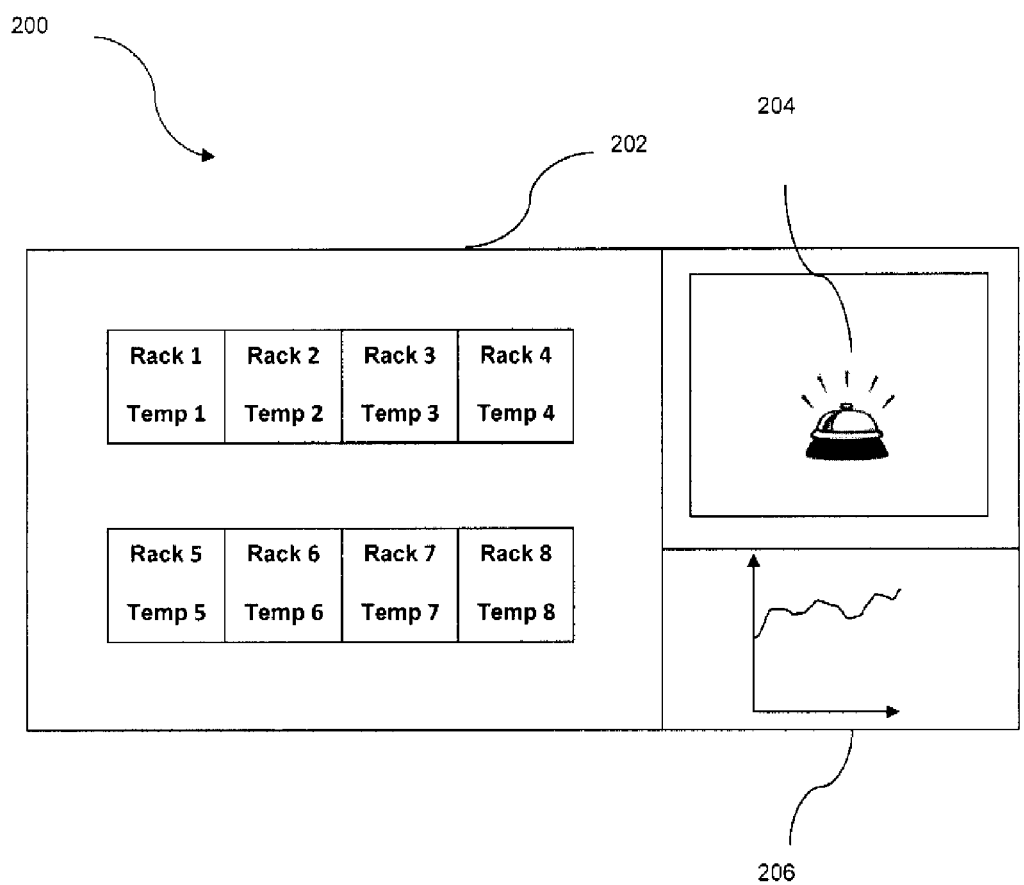
FIG. 2 showing a display device displaying monitored and predicted temperatures and alarms on a user interface.

Referring to FIG. 2 is a display device, displaying monitored and predicted temperatures on a user interface.

In an embodiments of the application, the user interface keeps the data center manager informed of the datacenter operating conditions and alerts the data center manager in case of any thermal problems. As shown in 202, the entire layout of the datacenter as seen from the top view is shown. Labels on each rack indicate the rack name and predicted or measured temperatures at rack inlet. It may also include the power consumption of each rack. As a visual clue, the colors of racks change with their predicted temperature. The user interface may also include the positions and temperatures predicted at locations other than inlets of racks. Alarms or Notifications (204) and temperatures maps (206) such as the temperature v/s time are also displayed on the user interface.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal displays (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

The preceding description has been presented with reference to various embodiments. Persons skilled in the art and technology to which this application pertains will appreciate that alterations and changes in the described structures and methods of operation can be practiced without meaningfully departing from the principle, spirit and scope.

We claim:

1. A method for facilitating thermal management of a data center, the method comprising:
   monitoring temperatures and power consumption using sensors positioned at a first location of a data center;
   predicting, by a processor, temperatures at a second location, of the data center, using a thermal model, the temperatures monitored, and the power consumption at the first location, wherein the thermal model uses a) Computational Fluid Dynamics (CFD) to calculate influence indices related to a pair of components of the data center to optimize a numbers of sensors in the data center and b) conservation equations corresponding to the temperatures monitored, and wherein the influence indices are non-dimensional numbers indicative of a ratio of heat conditions of target components placed at the first location, and wherein the influence indices are calculated using at least one of air tracer method, heat tracer method, and massless particles method based on air flow, temperatures, and heat information related to the source components and the target components;
   defining, by the processor, a threshold temperature for the first location and the second location; and
   generating an indication, by the processor, when the temperatures monitored at the first location and the temperatures predicted at the second location exceeds the threshold temperature, thereby facilitating thermal management of the data center.

2. The method of claim 1, wherein the first location is one of inlets and outlets of racks, supply and returns of Computer Room Air Conditioners (CRAC's) of the data center.

3. The method of claim 1, wherein the second location is one of inlets and outlets of racks, supply and returns of Computer Room Air Conditioners (CRAC's) of the data center.

4. The method of claim 1, wherein the influence indices related to the pair of components are calculated using air flow, temperature, and heat related information pertaining to the pair of components.

5. The method of claim 4, wherein the influence indices related to the pair of components are calculated using a method selected from a group consisting of an air tracer method, a heat tracer method, massless particles method and measurements based method.

6. The method of claim 1, further comprising selecting a configuration of the data center comprising of design parameters and operational parameters.

7. The method of claim 6, wherein the design parameters are related to devices selected from a group of devices consisting of cooling infrastructures, cooling devices, CRAC's, racks, and heat generating devices housed in the racks.

8. The method of claim 6, wherein the operational parameters are related to devices selected from a group of devices consisting of cooling infrastructures, cooling devices, CRAC's, racks, heat generating devices housed in the racks, and wherein the operational parameters comprise supply temperature and flow rates of the CRAC's, actual power consumed by the racks, and airflow of the racks.

9. The method of claim 1, wherein the source components and the target components are selected from a group consisting of cooling devices, racks, heat generating devices housed in racks, perforated tiles, and other flow generating devices.

10. The method of claim 1, further comprising determining cooling characteristics of the data center and determining thermal inefficiencies in the data center, wherein the thermal inefficiencies are determined based on the influence indices.

11. A system for facilitating thermal management of a data center, the system comprises:
    sensors, positioned at a first location of a data center, to monitor temperatures and power consumption;
    a processor;
    a memory coupled to the processor, wherein the processor is capable of executing programmed instructions stored in the memory to:
    predict temperatures at a second location, of the data center, using a thermal model, the temperatures monitored, and the power consumption at the first location, wherein the thermal model uses a) Computational Fluid Dynamics (CFD) to calculate influence indices related to a pair of components of the data center to optimize a numbers of sensors in the data center and b) conservation equations corresponding to the temperatures monitored, and wherein the influence indices are non-dimensional numbers indicative of a ratio of heat conditions of target components placed at the second location to heat conditions of source components placed at the first location, and wherein the influence indices are calculated using at least one of air tracer method, heat tracer method, and massless particles method based on air flow, temperatures, and heat information related to the source components and the target components;
    define a threshold temperature for the first location and the second location; and
    generate an indication when the temperatures monitored at the first location and the temperatures predicted at the second location exceeds the threshold temperature, thereby facilitating thermal management of the data center.

12. The system of claim 11, wherein the first location is one of inlets and outlets of racks, supply and returns of Computer Room Air Conditioners (CRAC's) of the data center.

13. The system of claim 11, wherein the second location is one of inlets and outlets of racks, supply and returns of Computer Room Air Conditioners (CRAC's) of the data center.

14. The system of claim 11, wherein the influence indices related to the pair of components are calculated using air flow, temperature, and heat related information pertaining to the pair of components.

15. The system of claim 14, wherein the influence indices related to the pair of components are calculated using a method selected from a group consisting of an air tracer method, a heat tracer method, massless particles method and measurements based method.

16. The system of claim 11, further comprising selecting a configuration of the data center comprising of design parameters and operational parameters.

17. The system of claim 16, wherein the design parameters are related to devices selected from a group of devices consisting of cooling infrastructures, cooling devices, CRAC's, racks, and heat generating devices housed in the racks.

18. The system of claim 16, wherein the operational parameters are related to devices selected from a group of devices consisting of cooling infrastructures, cooling devices, CRAC's, racks, heat generating devices housed in the racks, and wherein the operational parameters comprise supply temperature and flow rates of the CRAC's, actual power consumed by the racks, and airflow of the racks.

19. The system of claim 11, wherein the source components and the target components are selected from a group consisting of cooling devices, racks, heat generating devices housed in racks, perforated tiles, and other flow generating devices.

20. The system of claim 8, further comprising determining cooling characteristics of the data center and determining thermal inefficiencies in the data center, wherein the thermal inefficiencies are determined based on the influence indices.

21. The system of claim 11, wherein the influence indices are calculated using the heat tracer method by:
    making a step change in the heat condition of an outlet of one source component of the source components at a single time, whereby the step change affects the heat condition of at least one inlet of the target components; and
    comparing the heat condition at the inlet of the target component with the predicted temperatures of the target components at the second location of the data center.

22. A method for facilitating thermal management of a data center, the method comprising:
    monitoring temperatures and power consumption using sensors positioned at a first location of a data center;
    predicting, by a processor, temperatures at a second location, of the data center, using a thermal model, the temperatures monitored, and the power consumption at the first location, wherein the thermal model uses Computational Fluid Dynamics (CFD) to calculate influence indices related to a pair of components of the data center to optimize a numbers of sensors in the data center, and wherein the influence indices are non-dimensional numbers indicative of a ratio of heat conditions of target components placed at the second location heat conditions of source components placed at the first location, and wherein the influence indices are calculated using a heat tracer method, by:
        making a step change in the heat condition of an outlet of one source component of the source components at a single time, whereby the step change affects the heat condition of at least one inlet of the target components; and
        comparing the heat condition at the inlet of the target component with the predicted temperatures of the target components at the second location of the data center;
    defining, by the processor, a threshold temperature for the first location and the second location; and
    generating an indication, by the processor, when the temperatures monitored at the first location and the temperatures predicted at the second location exceeds the threshold temperature, thereby facilitating thermal management of the data center.

* * * * *